G. W. DUDLEY.
RECORDING AND ADDING MACHINE.
APPLICATION FILED AUG. 6, 1903.

1,019,231.

Patented Mar. 5, 1912.

Attest
V. Middleton
Edward Sartow

Inventor
George W. Dudley
by Ellis Spear & Company
Attys.

G. W. DUDLEY.
RECORDING AND ADDING MACHINE.
APPLICATION FILED AUG. 6, 1903.

1,019,231.

Patented Mar. 5, 1912.
6 SHEETS—SHEET 6.

Fig. 15.

Attest:
C. S. Middleton
Edward Sarton

Inventor
GEORGE W. DUDLEY
by Ellis Spear & Company
Atty's

UNITED STATES PATENT OFFICE.

GEORGE WILSON DUDLEY, OF STAUNTON, VIRGINIA.

RECORDING AND ADDING MACHINE.

1,019,231. Specification of Letters Patent. Patented Mar. 5, 1912.

Application filed August 6, 1903. Serial No. 168,510.

*To all whom it may concern:*

Be it known that I, GEORGE WILSON DUDLEY, citizen of the United States, residing at Staunton, Augusta county, Virginia, have invented certain new and useful Improvements in Recording and Adding Machines, of which the following is a specification.

The present invention relates to machines employed in banks and mercantile establishments for facilitating listing, tabulating and computing, and the principal objects are (1) to provide for automatically alternating adjustments so that a predetermined number of entries can be made in one order as from left to right along a horizontal line and then in another order as from top to bottom in a vertical line; (2) to provide for accumulating numerical items to show totals of certain rows or series of entries and not others. Thus the invention provides for producing such a table as for example one comprising a vertical row of figures representing the numbers of checks and a parallel row of figures representing the amounts of the checks, and there will be no accumulation or addition of the numbers of the checks (which would be footless) but there will be an accumulation of the amounts of the checks so that a total can be had through mechanical computation at any time. It will be at once apparent that the field in which a machine having such capabilities would be useful, is a very extensive one, and it is sufficiently obvious without multiplying specific examples, that a great variety of work falls within the possibilities of a machine of this character.

Of course the adding machine *per se* is today a familiar thing and its capabilities for printing lists of numbers and footing up totals well understood. Furthermore the lateral shifting of the work-support or paper carriage in such machines to provide for listing in multiple columns is well known. Neither is it new in a tabulating machine to automatically shift the paper carriage laterally with each operation of the machine so as to successively print numbers in a horizontal row, repeating this order of procedure so as to produce parallel vertical rows or columns. As an improvement in listing or tabulating machines without necessarily including the adding feature the present invention advances the art by providing for predetermining through automatic means the number of changes of relative adjustment between the work and the marking means (*e. g.* lateral shifts of the paper carriage) which shall take place before a change in relative adjustment in the other direction as by line-spacing, and for the latter change ensuing automatically. The invention also provides for an automatic restoration to normal in the transverse relative adjustment of the work and the marking means as by reverse lateral shifting of the paper carriage. This will be seen to greatly facilitate tabulation as compared with the workings of machines requiring separate manual operations to change the order or direction of shift at any certain point. As an improvement upon tabulating adding machines the present invention provides for automatically eliminating the adding function under predetermined relative adjustments of the work and the marking means as for instance Letters Patent of the United States #712,777 dated Nov. 4th 1902.

The invention is capable of embodiment in conjunction with various types of tabulating and adding machines.

In the accompanying drawings

As this machine in its general form is similar to that disclosed in the patent mentioned, it will not be necessary to describe the same herein and it is thought sufficient to point out the following parts bearing the same reference letters as in the patent in order that a general understanding of machine may be obtained:

1 are the printing disks, 1' the adding disks, 7 the selectors for the printing disks, 7' the selectors for the adding disks, 165 is the pin drum controlling the carrying mechanism of the adding mechanism, 72 the operating handle, 69 the master wheel, 16 the rack bar communicating movement from the universal bar 24 to the selectors, and 132 the clutch by which the adding mechanism may be connected to or disconnected from operative connection with the said rack.

Figure 15:
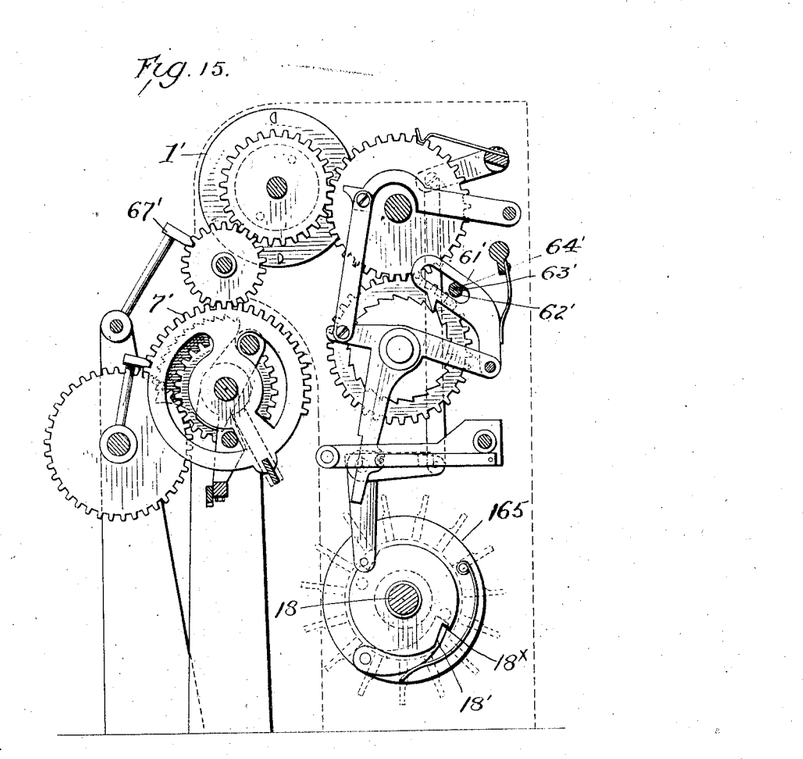
Fig. 15 is a sectional view showing the adding mechanism with its carrying mechanism.

Proceeding now with the description of the present machine: The carriage has a bar 3 slidable in a channel bar 4 fixed to the frame, and said carriage is adapted also to rock forward for making the impression upon the paper. The bar 3 in the present invention is provided with rack teeth $1^x$ engaged by a gear $2^x$ Figs. 1, 4 and 5 fixed on a shaft 5 journaled in bearings 6 of the frame. The shaft carries a bevel pinion $7^x$ meshing with a pair of bevel gears 8 and 9 fixed to gears 10 and 11 in turn fixed to their respective shafts 12 and 13 independently journaled in parts of the frame. These gears 10 and 11 are to be actuated alternately by segments 14 and 15 Fig. 1 on a sleeve $16^x$ splined to a sleeve 23 on the shaft 18 which shaft through the gearing 19, 20 and 21 is connected with the operating handle 72 and rocks forward and backward therewith. The shaft 18 is connected by a clutch $18^x$ Figs. 1 and 15 with the pin drum 65 loose on the shaft 18 so that the said pin drum will partake of only the forward movement of the shaft and as said pin drum has the sleeve 23 fixed rigidly thereto said sleeve together with the sleeve $16^x$ and its segmental gears 14 15 will make a one half revolution forward each time the hand lever moves to the rear and if said sleeve $16^x$ has then been set by hand as will be hereinafter described, so that its segments are in line with the gears 10 and 11 it will be seen that, as these segments have their teeth displaced circumferentially in relation to each other, when the handle makes one complete oscillating movement one of the segments on the return of the said handle will turn the gear 11 and this through the bevel gear 9 pinion $7^x$ and gear wheel $2^x$ will move the paper carriage from right to left and on the next complete forward and backward operation of the handle and while the handle is moving back to normal position the first segment will be out of mesh with the gear and the other segment 14 will operate its gear 10 and through the gearing mentioned above the paper carriage will be moved from left to right.

It will be understood that the printing is done on the forward stroke of the handle from its normal position of rest and starting with the carriage at the right of the machine the first action is to set up the number by striking the keys and thus setting up the selector disks 7, 7' and then by drawing the handle forward the printing disks are set up precisely as in the patent mentioned and in the final part of the forward movement of the handle the paper carriage is swung forward to make the impression against the type, and the carriage being at its right hand position the printing will be done at the left hand side of the paper strip or sheet. Now upon releasing the handle and allowing the same to move back to its normal position the gearing above described will shift the carriage to the left and the next printing action will take place at the right hand side of the paper or strip and in line horizontally with the impression just made at the left hand side. We will suppose the number printed at the left represents the number of the check, bill, cargo, etc. while that at the right represents the amount of the said check etc. These companion numbers will be in line with each other across the page. For this purpose, i. e., printing the amount in line with the check number I provide means for throwing out of operation the paper feed pawl 130, Figs. 4 and 6 when the number representing the amount is to be printed and this consists of a cam plate 27 Figs. 2, 6 and 16 secured to the carriage and arranged to strike the paper feed pawl 130 when the carriage is shifted to the left for printing the amount, said cam plate pushing and holding the pawl out of engagement with the paper feed ratchet wheel 129. It will be understood that the paper feed takes place on the forward stroke of the hand lever and just previous to the contact of the paper with the type but in printing the amounts there will be no paper feed owing to the cam holding the pawl out of line with the ratchet, and said feed will not take place until the carriage is shifted to the right again and the next check number is about to be printed, this movement releasing the pawl from the cam plate. The cam plate is pivoted at 30 to the carriage and may be held either in or out of operative position by a nut 31. The means for operating the paper feed pawl 130 will be described hereinafter.

In the printing of the check numbers it is necessary of course to prevent the operation of the adding mechanism and for this purpose I provide automatically operating means for throwing out of operation the adding mechanism whenever a check number or the like is printed, said means automatically throwing the adding mechanism into action when a number representing an amount or a number forming part of the computation is to be printed. This mechanism is as follows: As fully described in the patent aforesaid the movement from the keys is imparted through a universal bar 24 and a rack bar 16 to a sleeve carrying the selectors of the printing mechanism and a clutch 132 Fig. 1 imparts the revolution of the sleeve 36 to a shaft 35 upon which selectors of the adding disks are located and by shifting the said clutch the adding mechanism will be left inoperative. For operating the clutch automatically I provide an arm 37 Fig. 1 engaging a circumferential groove therein, said arm being on a sliding bar 37' supported in a frame and engaged at 38 by a fork 39 fixed on a rock shaft 40 journaled in the frame, said rock shaft having an arm 41 engaged detachably by a link 42 extending to a cam 43 on the shaft 5 Figs. 4 and 12. This cam is rocked one way for each return movement of the handle lever so that for one half the time the clutch is out of engagement and for the other half it is in engagement, it being out of engagement while the check numbers are being printed and in engagement when the amounts are printed.

Figures 1, 2, 3, 13, 14, 16:
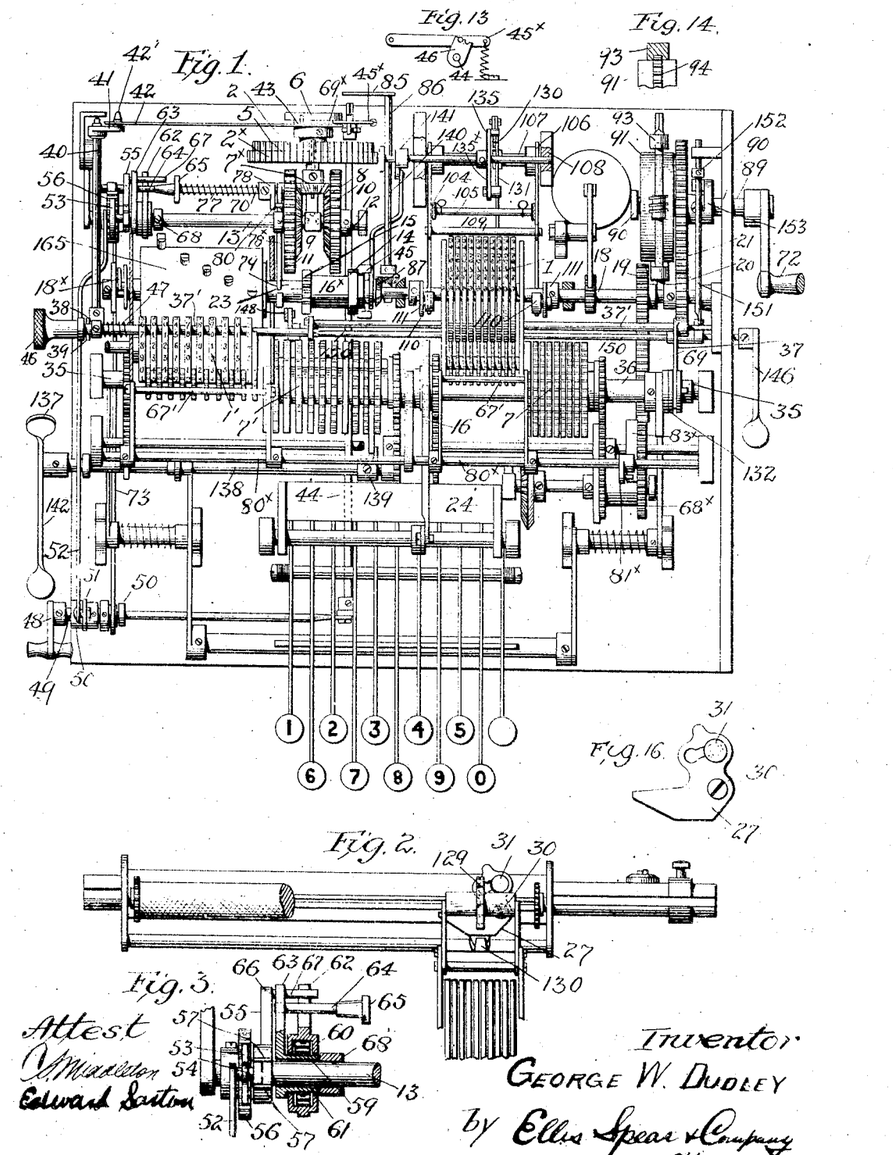
Figure 1 is a plan view of the machine with the carriage and other parts omitted so as to show some of the mechanism located at the lower part of the machine.
Fig. 2 is a plan view of the carriage, parts thereof being omitted.
Fig. 3 is a detail view.
Figs. 13 and 14 are further detail views.
Fig. 16 is a view of a detail.
Figures 4, 12:
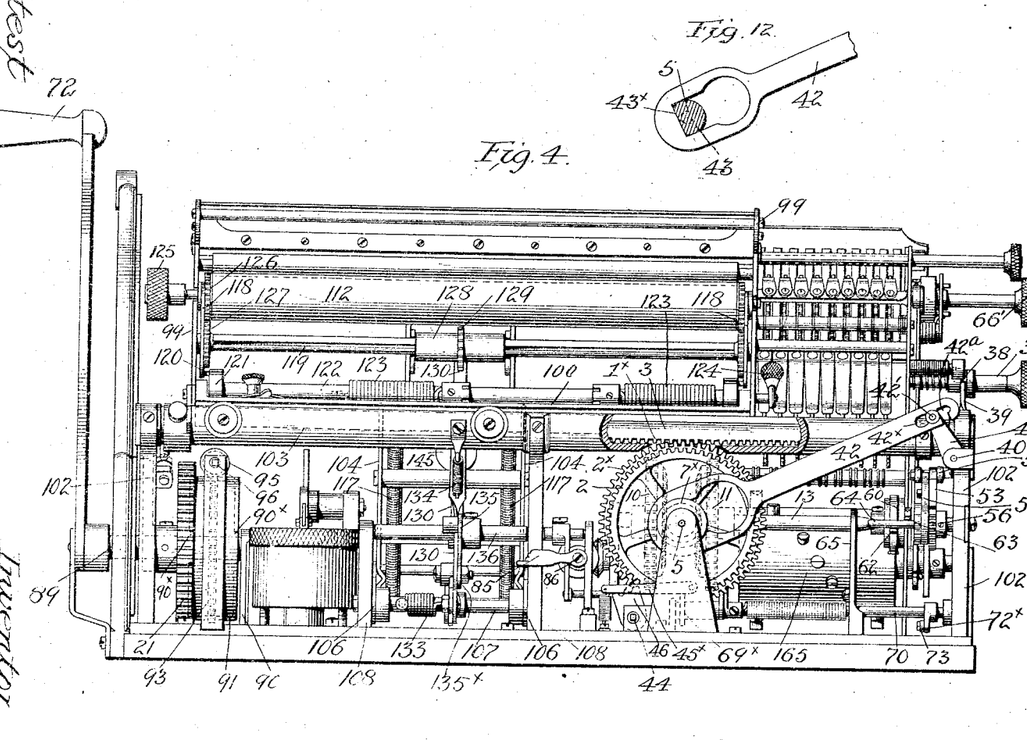
Fig. 4 is a rear view of the machine.
Figs. 8, 9, 10, 11 and 12 are views of details.
Figure 5:
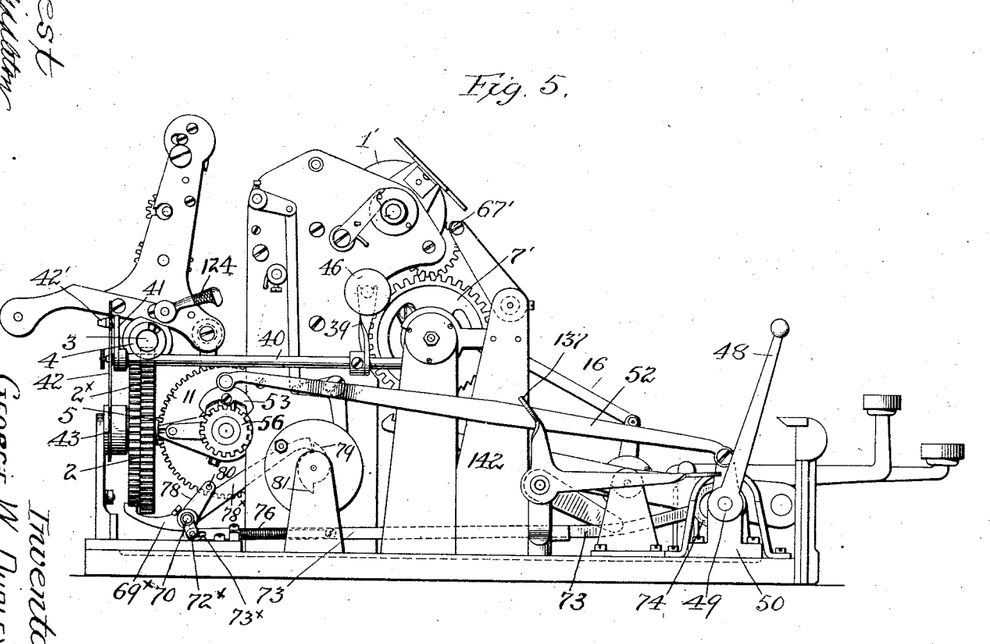
Fig. 5 an elevation of the left hand side of the machine.
Figures 7, 8, 9, 10, 11:
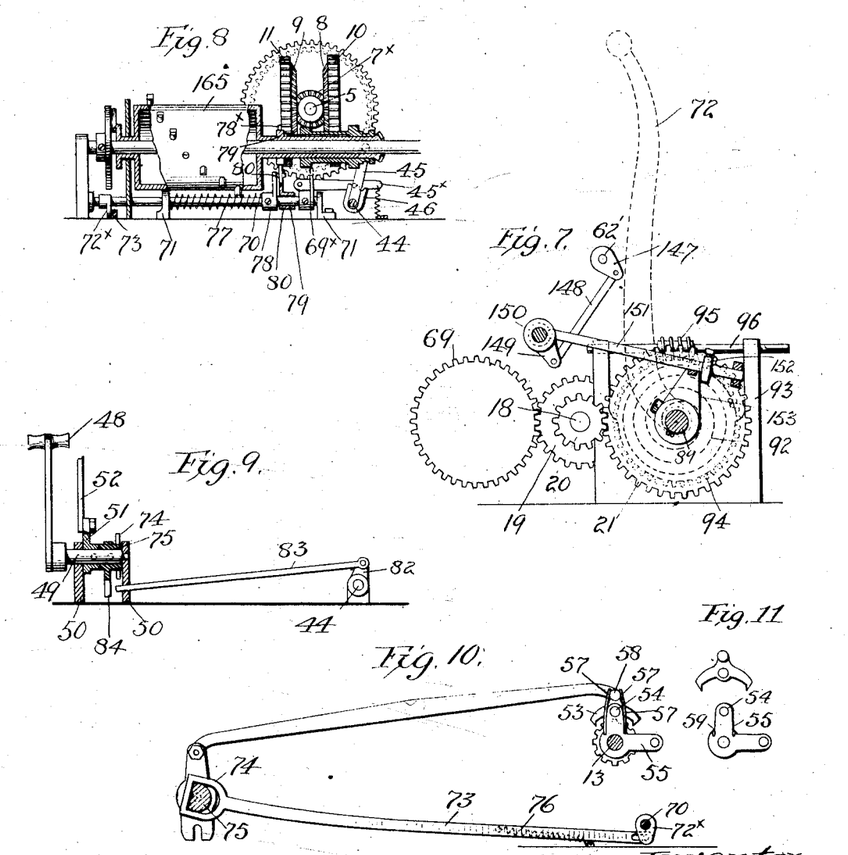
Fig. 7 is a detail view of driving connections.

The cam is shown in detail in Fig. 12, it having a flat side 43× engaging a flat part of the link 42. The machine may be set for printing and adding the amounts continuously, .. e., without printing also the check numbers and for this purpose the sleeve 16× may be shifted to carry its segments out of line with the gears 10, 11 which operate the carriage. To do this I employ a rock shaft 44 suitably journaled and having a fork 45 Figs. 1 and 8 engaging the sleeve 16× to shift it toward the right and now when the handle is operated and the shaft 18 turns the sleeve simply rotates idly. The rock shaft is operated by a suitable key engaging the square end of the shaft, and said rock shaft may be held in either position to which it may have been shifted by a spring detent 45× having a pin engaging a fork 46 on the shaft. Figs. 1, 8 and 13. When this shifting is done it is necessary also to disconnect the clutch throw-out mechanism and this is done simply by detaching the link 42 from the arm 41, said link being slotted at 42× so that by pressing the arm 41 to the left Fig. 4 the large part of the slot will come opposite the pin 42' for its free removal therefrom, and then the pin may rest in the notch 42ª at which adjustment the link 42 is out of operative engagement with the cam.

If at any time it is desired to throw the adding mechanism out of action temporarily the operator may do so by pressing on the button 46 attached to the slide bar 37'. A spring 47 presses the bar with the clutch back to normal position in which the clutch is engaged.

The above described mechanism for operating the carriage longitudinally is in the nature of automatic devices. In addition to these I have provided manual operating means by which the carriage may be shifted longitudinally in either direction.

When the manual shifting means is to be used the sleeve 16× with its segmental racks or gears is shifted to the right Fig. 1 by means of the key above described applied to the shaft 44 and the transmission of the power to the carriage is now performed by the gear 11 with which the manually operated connections are associated as will now be described. These connections consist of a finger lever 48 fixed on a shaft 49 Figs. 1, 5 and 9 journaled in bearings 50, said shaft carrying an arm 51 connected by a link 52 with a pawl 53 Figs. 1, 3 and 10 pivoted at 54 to a pawl carrier or rocker arm 55 loose on the shaft 13 which carries the gear 11 as before described. The pawl has two arms to separately engage the ratchet wheel 56 fixed on the said shaft 13 but normally the pawl is held out of engagement with the ratchet by two springs 57 engaging the opposite sides of the pin 58 of the pawl, said springs being seated in notches 59 in the pawl rocker or carrier. When the handle 48 is moved in either direction the first action will be to tip the pawl into engagement with the ratchet, the spring 57 on that side yielding and the continued movement of the handle and link will then move the pawl with its rocker and the pawl being now in engagement with the ratchet the shaft 13 will be turned and through the gear 11 pinion 7× and gear 2× the carriage will be shifted and this shifting movement may take place in either direction the action of the pawl being precisely the same whether the finger lever is moved in one direction or the other. It will be noticed that the link 52 connects with the pawl above its pivot and so tips the pawl to engage with the ratchet when moved either way. For returning the pawl and finger lever to normal position I employ a spring 59 coiled in a drum 60 loose on a sleeve 1, Fig. 3 which is loose on the shaft 13. The drum and the sleeve have each an arm 62, 63 respectively, that on the drum bearing on the under side of a pin 64 of a standard 65 fixed to the frame while the arm 63 on the sleeve is in contact with the upper side of the said fixed pin. One end of the spring is connected to the drum and the other end to the sleeve, the tendency of which is to keep the arms pressed against the fixed pin. The pawl rocker has an arm 66 provided with a pin 67 extending in between the spring pressed arms 62, 63 so that whether the pawl rocker is moved one way or the other its pin will encounter one of the spring pressed arms and will be returned thereby to normal position immediately the finger lever is released. In the action just described when either arm 62 or 63 is moved by the pawl rocker the other arm is held by the pin 64 and consequently one end of the spring is held firmly in position while the other end moves with the other arm and in relaxing returns it to normal position. This arrangement of oppositely presesd spring arms and the fixed pin serves to return and hold the pawl in its central disengaged position. A collar 68 fixed on the shaft 13 serves to hold the drum in proper position on the said shaft. By the finger lever 48 the carriage may be shifted step by step from side to side.

In order to hold the carriage and connected mechanism in any position to which it may have been moved I employ a detent 69$^x$ fixed on a shaft 70 journaled in bearings 71 and connected by an arm 72$^x$ with a link 73 having an eccentric strap 74 acted on by a cam 75 fixed on the shaft 49 of the finger lever so that each time the finger lever is operated to shift the carriage the cam 75 will draw upon the link and turn the shaft 70 to throw the detent out of engagement with the toothed wheel 2 fixed to the carriage gear 2$^x$ and this throwing out action takes place during the time the pawl 53 is being set into engagement with the ratchet wheel for shifting the carriage. The cam 75 has a flat side engaging a flat or straight part of the strap and the link 73 will be moved at once upon the movement of the cam. A spring 76 keeps the strap in close contact with the cam. The detent 69$^x$ is held in engagement by a spring 77 on the shaft 70, one end being fixed to the bearing 71 and the other end fixed to an arm 78 on the shaft. This detent is automatically thrown out of mesh when the carriage is shifted automatically in the printing and adding operations and for this purpose I place a cam 79 Figs. 1, 5 and 8 on the pin drum sleeve and a lever 78$^x$ loose on the shaft 70 engages this cam. The lever engages a pin 80 on the arm 78 fixed to the detent shaft 70 and when the lever rides up a high part 81 of the cam, there being two of these high parts the arm 78 will be operated through its pin 80 and the detent thrown out. The pin drum and sleeve make a one half revolution for each backward movement of the hand lever and the detent is thrown out and the carriage is shifted during each backward stroke of the hand lever. A slot 73$^x$ is formed on the link 73 which allows the arm 72$^x$ to have play when the shaft 70 is turned by the cam for the automatic release of the detent 69$^x$.

When the automatic connections are set for operation, i. e., with the segment sleeve to the left, it is necessary to lock the manually operated connections and for this purpose the setting shaft 44 Figs. 1, 4, 8 and 9 is connected by an arm 82 with a locking bar 83 which passes through the bearing 83$^x$ and engages a forked arm 84 Fig. 9 thus locking the finger lever and connections controlled thereby. When the automatic devices are disengaged by shifting the segment sleeve to the right the same action withdraws the lock of the manual operating connections.

Of course it will be clear that the listing of the amounts and the adding operations may go on without shifting the carriage when for instance it is not desired to put down the check numbers opposite the amounts, and in this case the detent 69$^x$ holds the carriage in any position to which it may have been set to print the amounts in the column desired.

In order that the carriage may be set in the proper position when the sleeve 16$^x$ is set for the automatic operation, I provide a pointer 85 on a shaft 86 geared to the pin drum sleeve as at 87 to turn in unison therewith and with the segments. The position of the pointer in Fig. 4 indicates that if the sleeve is shifted to the left to make the segments aline with the gears 10 and 11 the carriage ought at this time to be at its extreme left hand position for the next operation will impart such a movement to the gear 2$^x$ through the gear 10 as to shift the carriage to the right.

In my present machine instead of connecting the operating hand lever to the master wheel 69 as in the patent above referred to, I fix it upon a shaft 89 journaled in bearings 90 and passing through a drum 91 containing a spring 92 one end of which is attached to the drum and the other end to the shaft. The drum is held in a yoke or frame 93 and it has teeth 94 engaging a worm 95 on a shaft 96 journaled in the uprights of the said yoke. The said worm also acts to hold the drum in the yoke. The uprights of the yoke are grooved on their inner sides Fig. 14 to receive the teeth of the drum, which construction also serves to hold the drum in proper position within the yoke. Said drum has enlarged openings 90$^x$ Fig. 4 through which the shaft passes and said drum is supported in the yoke entirely independent of the shaft. The shaft has the gear 21 thereon meshing with the gear 20 on the shaft 18 and said shaft has a gear 19 meshing with the master wheel 69 through which the detent mechanism and the selector carriage mechanism are operated, as in the former patent. In the present instance the spring in the drum acts to return the hand lever to its rearmost limit and when the automatic connections to the carriage are set the said spring acts to shift the carriage longitudinally.

The paper carriage comprises end frames 99 connected by a plate 100 which has connected thereto the pivot bar 3 adapted to both turn and slide in the track or way 4 of tubular form which is slotted on its upper side for the passage of the web 101 connecting the said pivot bar with the said plate 100. The track or way is rigidly supported by the fixed standards 102 extending up from the base frame. The end frames of the carriage are also connected by a bar 103 which passes loosely through operating bars 130

104 extending downwardly, and pivoted to a cross bar 105 of a pair of levers 106 which are pivoted on a bar 107 rigidly supported in the standards 108. The levers 106 are connected by a cross rod 109 so that they with the cross rod move together as one frame.

Figure 6:
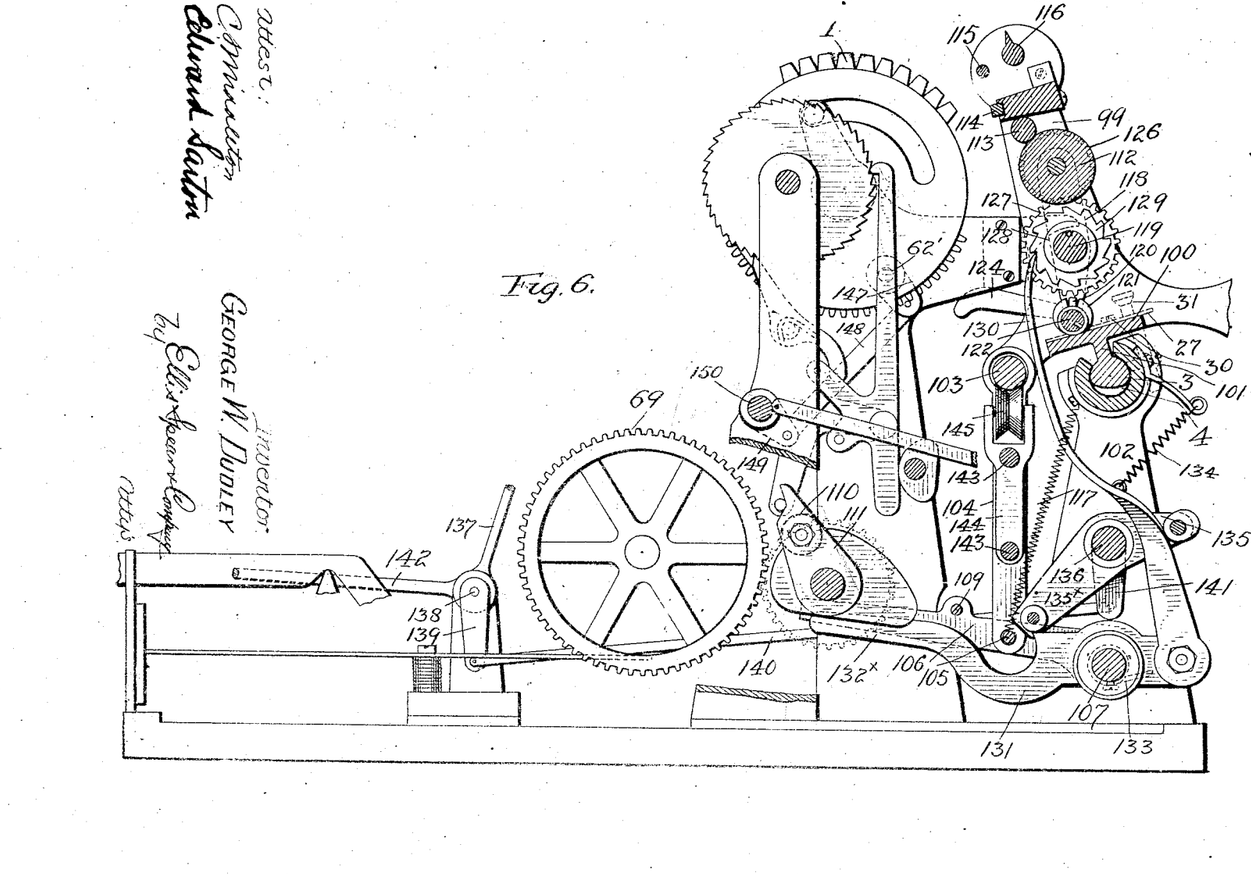
Fig. 6 is a vertical sectional view of part of the machine from front to rear.

The forward ends of the levers 106 are arranged to be operated by the rollers 110 dotted lines, Fig. 6 carried by arms 111 fixed to the shaft 18 which is turned backward and forward as the main hand lever (dotted lines Fig. 7) of the machine is swung forward and backward, the connection between these parts being through the gearing 19, 20, 21 before described.

As the main hand lever 72 is swung forward to set up the number to the printing point, and after the printing disks are set up, the continued forward movement of the hand lever 72 will through the connections just described cause the depression of the levers 106 and the cross bar 105 will draw down the rods 104 and thus cause the carriage frame to be tilted forwardly to force the paper against the type and thus make the impression, it being understood that the paper passes between the paper feed roller 112 and the roller 113 carried by the carriage frame, thence up in front of the platen 114 also carried by the carriage frame and then up between the cross rod 115 of this carriage frame and the cutting bar 116.

When the main hand lever is swung rearwardly to restore the printing disks and other parts as described in my said former application, the reverse action takes place, the arms 111 moving so as to carry the rollers 10 away from the levers 106 and thus allowing said levers to rise and the paper carriage to swing back to normal position, this action taking place in the first part of the return movement of the main hand lever, to the position shown in Fig. 6. Springs 117, one end of each of which is connected to the rod 105 and the other ends to the fixed frame-work, serve to swing the paper carriage and the levers 106 to their normal position after the rollers 110 free the said levers 106.

The paper feed roll 112 is carried by arms 118 pivotally supported on a shaft 119, journaled in the end frames of the paper carriage frame. These arms at their lower ends have pins 120 extending into notches or slots in arms or collars 121 fixed on a shaft 122 which is journaled in the end frames of the paper carriage. This shaft is under tension of springs 123 tending to press the paper feed roller against the roller 113 to secure proper contact and pressure for feeding the paper. A finger lever 124 on the end of the shaft when pressed down serves to force the feed roll away from the roller 113 for the proper manipulation of the paper in placing it, removing or adjusting it, and when the finger lever is released the springs will return the feed roll to normal position. The feed roll may be turned by hand through the knob or finger piece 125.

To turn the feed roll automatically it is provided with gear wheels 126 one at each end meshing with gears 127 fixed on the shaft 119. This shaft is connected by a spline with a sleeve 128 carrying a ratchet wheel 129 which is adapted to be turned one tooth at each forward movement of the main hand lever through a pawl 130 which is pivoted to a lever 131 pivoted on the fixed cross rod 107, the forward end of said lever being operated by a cam 132$^x$ fixed on the shaft 18 before mentioned, said shaft having its bearings in any suitable part of the frame work. The lever 131 is returned to its upper normal position by a spring 133, one end of which is fixed to the rigid cross bar 107 and the other end being secured to the lever. By this spring raising the pawl lever the pawl is retracted for a new tooth when the hand lever is swung rearwardly. The pawl is also pressed by a coil spring 134 to remain in contact with the teeth of the ratchet.

To throw the pawl out of action so that the paper feed roll may be turned in either direction by hand I have provided a release finger 135 carried by a shaft 136 journaled in the standards 108 and operated by a finger lever 137 through shaft 138, arm 139, link 140 and arm 141. The release finger when moved strikes the pawl and throws it out of the ratchet teeth against the tension of the spring 134, allowing the feed roll to be turned in either direction. An arm 135$^x$ on the shaft 136 is used also to turn the paper feed roll step by step by hand for which purpose the said arm has a roller to bear on the lever 131 and a second finger lever 142 is provided on the shaft 138 for operating the side arm 135$^x$ through the connections described, viz.; 139, 140, 141. The operation of these connections in this instance is in a direction opposite to that necessary to throw the pawl out of operation, the arms 135—135$^x$ extending in opposite directions from the shaft 136. The arms 104 have cross bars 143 carrying a bracket 144 having a roller 145 journaled therein on which the rod 103 rests as the carriage slides. The openings through the arms 104 are large enough to prevent contact with the bar 103, thus avoiding friction.

Resetting adding disks to zero: In order to reset the adding disks 1' to zero I have provided means whereby the carrying pawls 61' which act in carrying digits from one order to the next higher may be thrown out of connection with the carrying train, this means consisting of a shaft 62' journaled in the frame of the adding mechanism and having a wing 63' adapted to engage the walls of slots 64' formed in the pawls through which slots the shaft extends. The shaft is connected with a finger lever 146 through arm 147, link 148, arm 149 and rock shaft 150, and when the finger lever is pressed the wing will move all of the carrying pawls out of connection and the adding disks may then be reset by turning the knob 66' on the shaft of the adding disks. In order to free the adding disks it is necessary to withdraw the detents 67' from connection with the gear trains and for this purpose I make a connection between the wing shaft 62' and the master wheel so that when the carrying pawls 61' are thrown out of action by pressing the finger lever 146 the same operation will throw out the detent 67' and thus free the adding disks for the resetting action, the said detent being arranged in the same relation to the adding and printing trains as is shown in the patent mentioned and operated from the master wheel in a similar manner to that shown in said patent. This connection to the master wheel consists of the link 151 having a collar 152 to operate the arm 153 on the shaft 89 so that through the gearing 21, 20 and 19 the master wheel will be operated whenever lever 146 is pressed and this master wheel through its connection with the detents 67' will throw the same out of operation to free the adding disks for the resetting action to zero. The connection mentioned consists of the gear $68^x$ Fig. 1 the cam $83^x$, Fig. 1 arm $81^x$ and the shaft $80^x$, carrying the detents, similar numerals without the exponent $x$ being used to designate like parts in the patent mentioned.

It will be understood that the term automatic refers to the action of the carriage which is derived through mechanism acting to move the carriage in a certain sequence or order in relation to the operation of the other elements and in this respect it is distinguished from the reciprocating movement of the carriage which is derived through connections designed to effect the adjustment of the carriage. In the present embodiment of this part of my invention the automatic action is derived through connections extending from the operating handle 72, but I do not wish to limit myself in this regard, and the hand operating connection in the present instance consists of the finger lever 48 and the devices between the same and the carriage and in this respect also I do not wish to limit myself. The automatic action might be obtained through other connections and likewise the hand operating connection might be differently arranged.

I claim

1. In an adding and recording machine, adding mechanism, printing mechanism including setting up means, impression means, and paper feed means, a paper carriage shifting automatically between impressions and means for throwing out of operation the paper feed means and the adding mechanism automatically, alternately, substantially as described.

2. In an adding and recording machine adding mechanism, printing mechanism and an automatically reciprocating carriage moving in one direction after one impression and in the opposite direction after another impression, substantially as described.

3. In combination with printing mechanism, including setting up means and impression means a paper carriage shifting after each impression, paper feed mechanism and means for throwing the paper feed means out of operation automatically when the carriage shifts to a certain position, said throw out means being rendered effective by the longitudinal movement of the carriage, substantially as described.

4. In combination with printing mechanism including setting up means and impression means, an automatically reciprocating paper carriage moving in one direction after one impression and in the opposite direction after another impression, line space mechanism for the paper on said carriage and means for throwing said line space mechanism out of operation automatically, substantially as described.

5. In combination, in an adding machine, adding means, printing means including setting up means and impression means, a hand lever for operating the impression means, a paper carriage with connections for shifting the same automatically from the operation of the hand lever, and automatic means for throwing the adding mechanism out of action, substantially as described.

6. In combination in an adding machine, adding mechanism, printing mechanism, including setting up means and impression means, a hand lever for operating the impression means a shiftable carriage with means for shifting the same from the hand lever, and automatic means for throwing the adding means out of operation, substantially as described.

7. In combination printing mechanism including a paper carriage, adding mechanism keys, connections therefrom to the adding mechanism independent of the carriage for operating the same and automatic means for throwing the adding mechanism out of operative connection with the keys, substantially as described.

8. In combination printing mechanism, adding mechanism, a paper carriage, line space mechanism on said carriage and automatic means for throwing the adding mechanism and the line space mechanism into and out of operation, substantially as described.

9. In combination adding mechanism, printing mechanism, an automatically reciprocating carriage shifting one way at one printing action and the other way at another printing action, line space mechanism on the said carriage, automatic means for throwing the adding mechanism out of operation and automatic means for preventing the line space mechanism from operating, substantially as described.

10. In combination with printing mechanism a paper carriage, paper feed mechanism and means for throwing the paper feed means out of operation automatically when the carriage shifts to a certain position said throw out means being rendered effective by the longitudinal movement of the carriage substantially as described.

11. In combination printing mechanism, setting up mechanism, means controlled by keys for operating the setting up mechanism, a paper carriage, a manually operated device for bringing the paper and printing mechanism together, and connections whereby the carriage is shifted one way on one operation of the said device and the other way on the next operation of said device, substantially as described.

12. In combination with printing mechanism a carriage, mechanism for moving the same, paper feed rolls on the carriage, a splined ratchet wheel for operating the paper feed rolls, a pawl fixed relatively to the longitudinal movement of the carriage and means on the carriage for throwing the pawl out of operation when the carriage reaches a predetermined position, substantially as described.

13. In combination with printing mechanism, a carriage, mechanism for moving the same, paper feed rolls on the carriage, a splined ratchet wheel for operating the paper feed rolls, a pawl fixed relatively to the longitudinal movement of the carriage and means on the carriage for throwing the pawl out of operation when the carriage reaches a predetermined position, said means being adjustable to be rendered ineffective, substantially as described.

14. In combination adding and printing mechanism, keys with connections to the adding and printing mechanism, a hand lever in connection with the adding and printing mechanism, a clutch controlling the adding mechanism, and means operated from the said hand lever for controlling the clutch, substantially as described.

15. In combination with adding and printing mechanism, keys, setting up connections between the keys and the adding and printing mechanism, a hand lever a rotary reciprocating shaft 18 in connection therewith, a pin drum on the said shaft with means for imparting a forward step by step movement thereto from the said shaft, said pin drum being associated with the adding mechanism, a shifting sleeve connected with the pin drum to rotate forwardly therewith step by step, a paper carriage and gearing between the said sleeve and paper carriage whereby the paper carriage will be moved in one direction at one forward step of the said sleeve and pin drum and in the other direction at the next forward step of the said sleeve and pin drum, substantially as described.

16. In combination with adding and printing mechanism, keys, setting up connections between the keys and the adding and printing mechanism, a hand lever, a rotary reciprocating shaft 18 in connection therewith, a pin drum on the said shaft with means for imparting a forward step by step movement thereto from the said shaft, said pin drum being associated with the adding mechanism, a shifting sleeve connected with the pin drum to rotate forwardly therewith step by step, a paper carriage and gearing between the said sleeve and paper carriage whereby the paper carriage will be moved in one direction at one forward step of the said sleeve and pin drum and in the other direction at the next forward step of the said sleeve and pin drum, said gearing comprising the non-alined segmental racks on the sleeve, the gears 10 and 11, the pinion 7 and the gear $2^x$, the said carriage having a rack to be engaged thereby, substantially as described.

17. In combination with adding and printing mechanisms, keys, connections therefrom to the said mechanisms, a hand lever, a rotary reciprocatory shaft 18 connected with the hand lever, connections operated thereby for controlling the adding and printing mechanisms, a paper carriage and means for automatically reciprocating the same from the shaft 18, substantially as described.

18. In combination with adding and printing mechanisms, keys, connections therefrom to the said mechanisms, a hand lever, a rotary reciprocatory shaft 18 connected with the hand lever, connections operated thereby for controlling the adding and printing mechanisms, a paper carriage and means for automatically reciprocating the same from the shaft 18, said means including a part rotating step by step in one direction, substantially as described.

19. In combination adding and printing mechanism, keys, connections therefrom to the adding and printing mechanism, an oscillating hand lever, a paper carriage and means for shifting the carriage in one direction on one oscillation of the said hand lever and in the other direction on another oscillation of the said hand lever, substantially as described.

20. In combination adding and printing mechanism, keys, connections therefrom to the adding and printing mechanism, an oscillating hand lever for controlling the said adding and printing mechanism, a paper carriage, connections operated by the said hand lever for moving the paper carriage and means for throwing said connections out of operation, substantially as described.

21. In combination adding and printing mechanism, keys, connections therefrom to the adding and printing mechanism, an oscillating hand lever for controlling the said adding and printing mechanism, a paper carriage, connections operated by the said hand lever for moving the paper carriage and means for throwing said connections out of operation, said connection comprising a step by step rotary sleeve, segmental gears thereon, gearing operated thereby and means for shifting the said sleeve, substantially as described.

22. In combination in an adding and printing machine, a paper carriage, a lever for operating the adding and printing mechanism with connections from said lever for moving the carriage in opposite directions automatically in the direction of its axis and a manually operated device for shifting the carriage, substantially as described.

23. In combination in an adding and printing machine, a paper carriage, a lever for operating the adding and printing mechanism with connections from said lever for moving the carriage in opposite directions automatically and a manually operated device for shifting the carriage and a lock for holding the manually operated device inactive, substantially as described.

24. In combination in an adding and printing machine means for operating the adding and printing mechanisms, a paper carriage, connections operated by said means for automatically moving the carriage in opposite directions, said connection including a shifting part to render the carriage immovable, a hand operating device for shifting the carriage and a lock for the same controlled by the said shifting part, substantially as described.

25. In combination adding and printing mechanisms, means for operating the same, a paper carriage, connections operated from said means for moving the carriage automatically in opposite directions, said connections including a shifting sleeve carrying segmental gears thereon and gearing between the same and the paper carriage, a hand operated device for shifting the carriage and a lock for the same with connections for setting the same to lock said device when the sleeve is set to shift the carriage automatically, substantially as described.

26. In combination adding mechanism, printing mechanism, operating means for said mechanisms, a paper carriage, means for shifting the same automatically comprising the gears 10, 11 and the pinion, and manually operating means for shifting the carriage said means being connected with one of the gears, substantially as described.

27. In combination in an adding and printing machine, adding mechanism, printing mechanism, means for operating the same, a paper carriage, means for shifting the same automatically and a hand device for shifting the carriage consisting of a ratchet wheel a double pawl for moving the ratchet in opposite directions and a hand lever connected to the double pawl. substantially as described.

28. In combination in an adding and printing machine, adding mechanism, printing mechanism, means for operating the same, a paper carriage, means for shifting the same automatically and a hand device for shifting the carriage consisting of a ratchet wheel, a double pawl for moving the ratchet in opposite directions, a pivoted pawl carrier to which the pawl is pivoted, means for applying a tension to the said pawl carrier when moved in either direction and a hand lever connected to the double pawl, substantially as described.

29. In combination in an adding and printing machine, adding mechanism, printing mechanism, means for operating the same, a paper carriage, connections for operating the same automatically from the operating means of the adding and printing mechanisms, a detent for the carriage, means for operating the same automatically, a hand operated device for shifting the paper carriage in either direction and a connection between the said hand operated device and the detent for operating the same, substantially as described.

30. In combination with the paper carriage a detent, a hand operating lever, connections between the same and the carriage for moving the carriage in either direction and a cam operated by the hand operating lever with connections between said cam and the detent, substantially as described.

31. In combination in an adding and recording machine, adding mechanism, printing mechanism, keys, connections between the keys and the adding and printing mechanism, a clutch controlling the adding mechanism, a paper carriage and hand lever with connections for controlling the adding and printing mechanism, a connection for shifting the carriage automatically comprising a gear $2^x$, a shaft carrying the same, means for turning the said gear in opposite directions, a cam on the shaft of the said gear and a connection from the said cam to the clutch for operating the same substantially as described.

32. In combination, adding mechanism, printing mechanism, keys with connections thereto for operating the said mechanisms, a paper carriage, a hand lever for controlling the adding and printing mechanisms, a connection controlled by the hand lever for shifting the carriage automatically and a pointer associated with the said connection to indicate its position in relation to the carriage, substantially as described.

33. In combination in an adding and printing machine, adding mechanism, printing mechanism, keys, connections between the said keys and adding and printing mechanism, a hand lever with connections for operating the adding and printing mechanism, a paper carriage, means for shifting the same automatically by the operation of the hand lever, said means including a shifting portion whereby the connection between the hand lever and the carriage may be thrown out at will and an indicator associated with the said shifting portion, substantially as described.

34. In combination with the printing mechanism including the swinging impression frame having also longitudinal adjustment, a bar or link connected with the frame to swing it and means connected with the bar or link for operating the same, substantially as described.

35. In combination a hand lever, the printing and adding disks, carrying mechanism for the adding disks, a shaft 18 with means for driving it from the hand lever, said shaft being connected with the carrying mechanism, the swinging platen frame, the bar or link connected therewith and a lever for operating the bar or link, said lever being operated from the shaft 18, substantially as described.

36. In combination with the printing disks, a swinging platen frame having a pivot bar 3, a channeled track bar 4 in which the pivot bar rests and means for swinging the platen frame, substantially as described.

37. In combination in an adding and recording machine, printing disks, adding disks, carrying mechanism for the adding disks, a shaft 18 for operating the carrying mechanism, a swinging platen frame, a lever operated from the shaft 18 for swinging the said frame, a paper roll carried by the said frame, pawl and ratchet mechanism for operating the same, and a lever for operating the said pawl, said lever being in turn operated from the shaft 18, substantially as described.

38. In combination, a paper roll, swinging arms carrying the same, a shaft upon which said arms are pivoted, gearing between said shaft and paper roll, a ratchet on said shaft, means for operating the ratchet, a shaft, means for turning the same and a connection between said shaft and swinging arms, substantially as described.

39. In combination with the frame carrying a paper roll and longitudinally movable, a ratchet relatively fixed in respect to the longitudinal movement of the frame, a shaft carried by the frame having a splined connection with the ratchet and a connection between the shaft and paper roll and with means for operating the ratchet, substantially as described.

40. In combination with printing mechanism, setting up mechanism, keys with connections to the setting up mechanism, means for making the impression and a paper carriage operated automatically in opposite directions from the impression making means to make impressions in different columns, substantially as described.

41. In combination in a machine of the class described a paper carriage, means for operating the same automatically and a hand operating connection, comprising a ratchet wheel, a double acting pawl, a pawl carrier, means for operating the pawl carrier, a spring drum, two arms under tension of the spring of the drum, a pin on the pawl acted on upon its opposite sides by the said arms and a fixed bearing for holding one of the arms when the other arm is operated, substantially as described.

42. In combination in an adding and printing machine, printing mechanism, a shaft 18 and connection therefrom to the adding mechanism, an oscillating paper carriage and a connection therefrom to the shaft 18, said connection including an arm having an enlarged opening engaging a part of the paper carriage loosely and a roller carried by the said arm affording a bearing for the said part of the paper carriage, substantially as described.

43. In combination in an adding and printing machine, a connection between the keys and the adding and printing mechanism, a hand lever, connections between the same and the adding and printing mechanism, a paper carriage adapted to reciprocate longitudinally and a spring for returning the hand lever to normal position and shifting the carriage, substantially as described.

44. In an adding machine, the combination of printing and adding mechanism, a longitudinally movable paper carriage, paper feeding mechanism therefor, means for bringing the carriage to different columnar positions, means for eliminating the functions of adding and paper feeding at one operation of the machine, and means for restoring the functions of adding and paper feeding at another operation of the machine, substantially as described.

45. In an adding machine the combination of printing and adding mechanism, a longitudinally movable paper carriage, paper feeding mechanism therefor, means for bringing the carriage to different columnar positions, means for eliminating the functions of adding and paper feeding while the carriage is in one position, and for restoring the functions of adding and paper feeding when the carriage is shifted to a different position, so that a number and an amount may be printed on the same horizontal line; substantially as described.

46. In an adding machine the combination of printing and adding mechanism, a longitudinally movable or shiftable paper carriage, paper feeding mechanism therefor, and means for controlling the functions of adding, paper feeding and carriage shift, so that the same may be made operative or inoperative at will, substantially as described.

47. In a machine of the character described, work supporting means and marking means relatively movable both longitudinally and laterally, and means for automatically changing the relative positions thereof in both directions with provisions for automatically disabling the means for changing relative positions in one direction during a predetermined number of changes of adjustment in the other direction and then automatically reënabling the means for changing relative positions in the first mentioned direction.

48. In a machine of the character described, the combination with work supporting means and marking means relatively movable both longitudinally and laterally, and means for automatically changing the relative positions thereof in both directions with provisions for automatically disabling the means for changing relative positions in one direction during a predetermined number of changes of relative positions in the other direction and then automatically reënabling the means for changing relative positions in the first mentioned direction; of adding mechanism and means for disabling the same under certain relative-positioning of said work supporting and marking means.

49. In a machine of the character described, the combination with work supporting means and marking means relatively movable, and means for automatically changing the relative positions thereof, of adding mechanism and means for automatically disabling the same under certain relative positioning of said work supporting and marking means.

50. In a machine of the character described, the combination of paper shifting means, listing means, adding mechanism, and means for disabling the adding mechanism through the medium of the paper shifting means.

51. In a machine of the character described, the combination with work supporting means and marking means relatively movable both longitudinally and laterally, and means for automatically changing the relative positions thereof in both directions with provisions for automatically disabling the means for changing relative positions in one direction during a predetermined number of changes of relative positions in the other direction, of adding mechanism and means for disabling the same under certain relative positioning of said work supporting and marking means.

52. In a machine of the character described, the combination with work supporting means and marking means relatively movable both longitudinally and laterally, and means for automatically changing the relative positions thereof in both directions with provisions for automatically disabling the means for changing relative positions in one direction during a predetermined number of changes of relative position in the other direction, of adding mechanism and means for disabling the same under certain relative lateral positioning of said work supporting and marking means.

53. In an adding and listing machine, adapted to print two or more columns from the same printing characters on a single piece of paper, the combination with a shiftable paper carriage, means for shifting said paper carriage, a printing mechanism, a totalizer, of setting up devices for conjunctively controlling the movements to a predetermined position of the printing type and totalizer wheels, and means for rendering the totalizer inoperative at a time when said setting up devices are in coöperative relation with said printing mechanism, whereby one column of numbers may be printed and registered in the totalizer, and an adjacent column of numbers printed without being registered in said totalizer, substantially as described.

54. The combination with printing type arranged to be placed in printing line to print side by side, means for effecting a printing impression, a paper carriage, and means for shifting the paper carriage in opposite directions after the printing impressions, substantially as described.

55. The combination with printing type, a paper carriage, means for effecting an impression from said type, said means also shifting the paper carriage alternately in opposite directions, substantially as described.

56. The combination with printing type, of means for positioning said type to print side by side, means for effecting a printing impression from said type, a paper carriage shiftable relative to the type, and means for shifting said paper carriage alternately in opposite directions so that each succeeding impression is located in separate columns, substantially as described.

57. The combination with printing type designed to be positioned so as to print side by side, a paper carriage, means for effecting a printing impression, and means for shifting the paper carriage a predetermined distance in opposite directions after the printing impressions, whereby separate columns are printed, a totalizer, and means whereby the items printed in one of such columns are accumulated in the totalizer, substantially as described.

58. The combination with series of printing type normally out of printing position, means for controlling the printing position of said type, a totalizer, means for connecting and disconnecting said totalizer from the controlling mechanism for the printing type, means for effecting a printing impression, said means also restoring the printing type and operating the totalizer, when connected, a paper carriage, means for shifting the paper carriage in opposite directions after the printing impressions, substantially as described.

59. The combination with a paper carriage, of a vibrating lever, and means coöperating with said lever whereby upon successive vibrations of said lever the paper carriage is shifted alternately in opposite directions, substantially as described.

60. The combination with a paper carriage, of a lever having a given stroke, and means whereby on succeeding strokes of the lever the paper carriage is shifted in opposite directions, substantially as described.

61. In an adding machine, the combination with adding mechanism and mechanism adapted to print a plurality of figures at a single operation, of a laterally movable paper carriage coöperating with the printing mechanism, a device operating to eliminate the function of the adding mechanism of the machine, and means controlling said device and determining whether it shall be operative or inoperative as determined by the particular position of the paper carriage, substantially as described.

62. In an adding machine, the combination of printing and adding mechanism, a longitudinally movable paper carriage, paper feeding mechanism therefor, means for bringing the carriage to different columnar positions, means for eliminating the functions of adding and paper feeding while the carriage is in one position and for restoring the functions of adding and paper feeding when the carriage is shifted to a different position, and means for printing a plurality of separate numbers and a plurality of separate amounts on the same horizontal line, each set of numbers and each set of amounts being adapted to be printed at one operation of the machine, substantially as described.

63. In a machine adapted to record and accumulate items, the combination with recording devices, accumulating devices, a platen movable relative to the recording devices to permit items to be recorded in different columns, means for normally holding the platen in position to record items in one column, and means for actuating both the recording and accumulating devices when the platen is in such normal position, of means for preventing the operation of the accumulating devices when the platen is shifted from said normal position to cause the recording of items in a different column, and means for automatically returning the platen to said normal position after an item has been recorded in said latter column.

64. The combination with a platen, printing devices adapted to coöperate with the platen, said platen and printing devices being relatively adjustable to permit the printing devices to print items in two columns, and means for feeding paper between the platen and printing devices, of means for normally actuating the paper feeding devices whenever the printing devices are operated, and means for preventing actuation of the paper feeding devices as an incident to relative positioning of platen and printing devices to cause items to be printed in one of said columns.

In testimony whereof, I affix my signature in presence of two witnesses.

GEORGE WILSON DUDLEY.

Witnesses:
W. A. HAINES,
A. W. HALE.